Patented Sept. 2, 1947

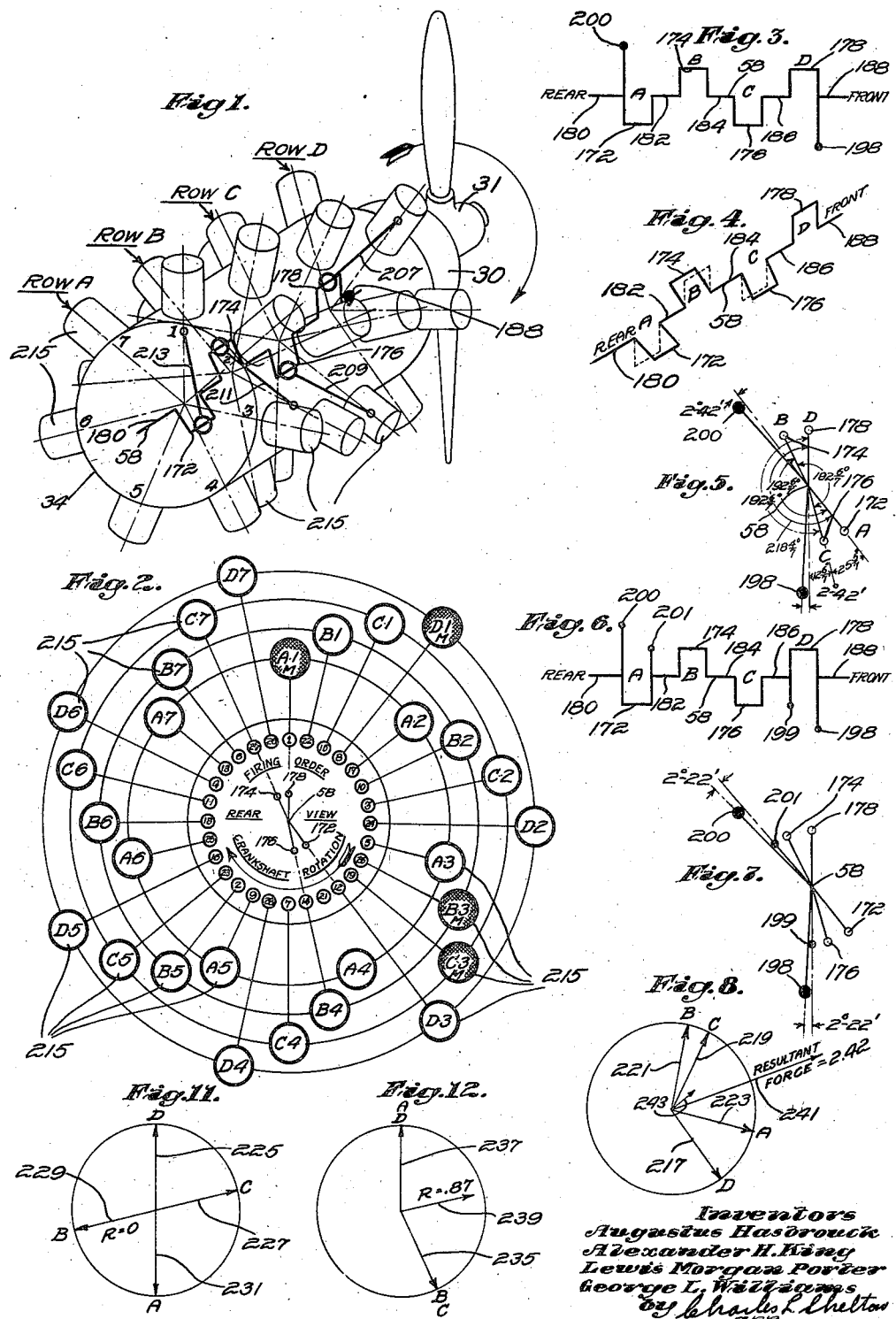

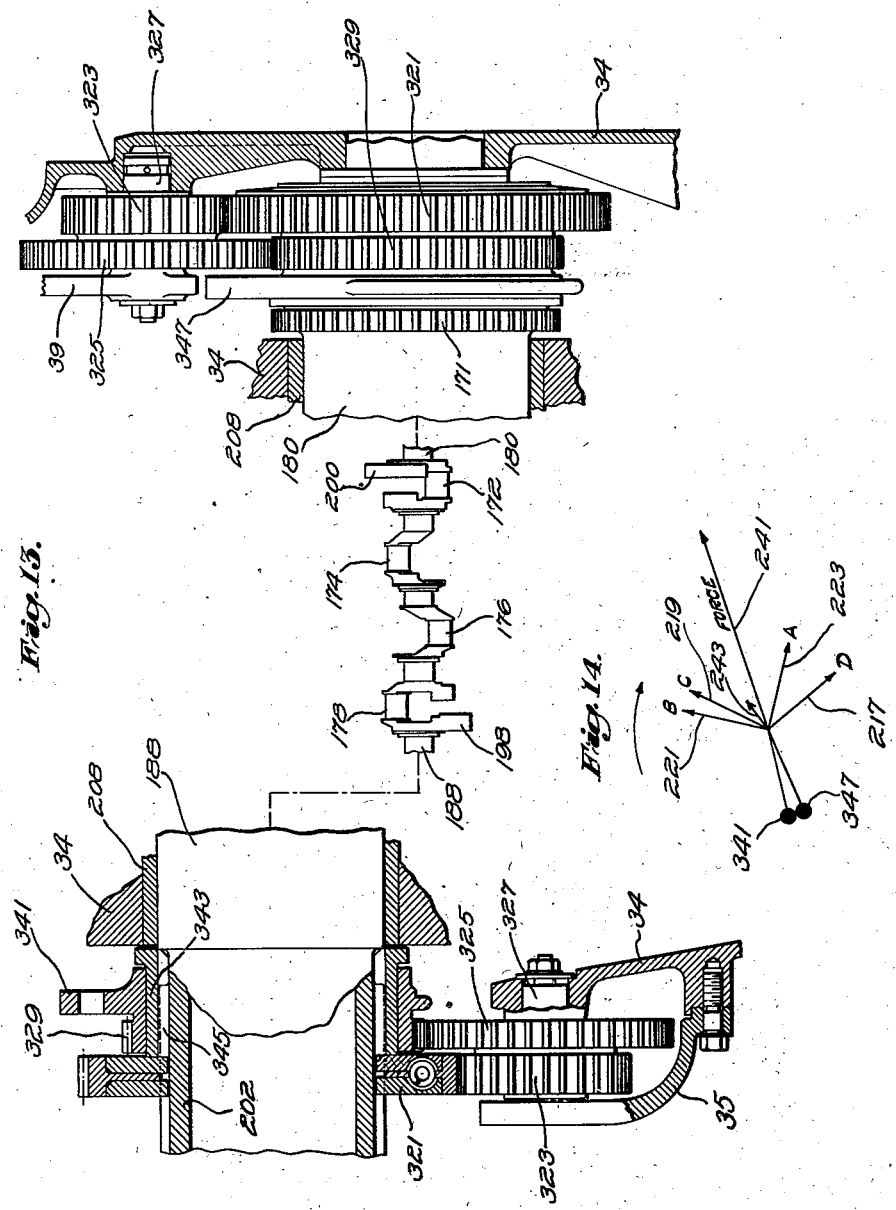

2,426,876

UNITED STATES PATENT OFFICE 2,426,876

RADIAL AIRCRAFT ENGINE

Augustus Hasbrouck, Middletown, Alexander H. King, West Hartford, and Lewis Morgan Porter and George L. Williams, Manchester, Conn., assignors to United Aircraft Corporation, East Hartford, Conn., a corporation of Delaware Application September 1, 1944, Serial No. 552,371

5 Claims. (Cl. 121—120)

This invention relates to balancing means for multi-row radial aircraft engines and comprises a modification of the engine balancing means disclosed and claimed in our application Serial No. 552,368, filed concurrently herewith.

An object of this invention is to provide a means for eliminating or reducing the more troublesome vibration producing forces in a four row radial engine having a master rod and articulated link rod assembly connecting the pistons of each row with a corresponding crank pin.

A further object is to provide a novel combination and arrangement of crankthrows, master rods, and counterbalances which will substantially eliminate all the objectionable vibration producing forces created by the articulated connecting rod assemblies of a radial engine.

Other objects and advantages will be apparent from the specification and claims, and from the accompanying drawings which illustrate what is now considered to be a preferred embodiment of the invention.

In the drawings:

Fig. 1 is an isometric schematic view showing the invention as applied to a four row engine having seven spiral banks of cylinders.

Fig. 2 is a diagram showing the relationship of the crankpin spacing to the cylinder spacing, and the cylinder firing order.

Figs. 3 and 5 are schematic side and end views of the engine crankshaft.

Fig. 4 is a schematic isometric view of the crankshaft, with the counterweights omitted.

Figs. 6 and 7 are schematic side and end views showing a modification of the crankshaft counterweighting.

Fig. 8 is a force diagram showing the relative positions and magnitudes of certain shaking forces produced in the various cylinder rows during operation of the engine of Figs. 1 and 2.

Figs. 11 and 12 are phase diagrams showing respectively the phase relationship among the first order harmonics and the second order harmonics illustrated in curve form in Fig. 10.

Fig. 13 is a schematic side view, partly in section, showing a pair of counterbalances arranged to rotate about the crankshaft axis at twice crankshaft speed.

Fig. 14 is a diagram showing the relation between the centers of mass of the counterweights of Fig. 13 and the forces represented by the vectors in Fig. 8.

Figure 10:
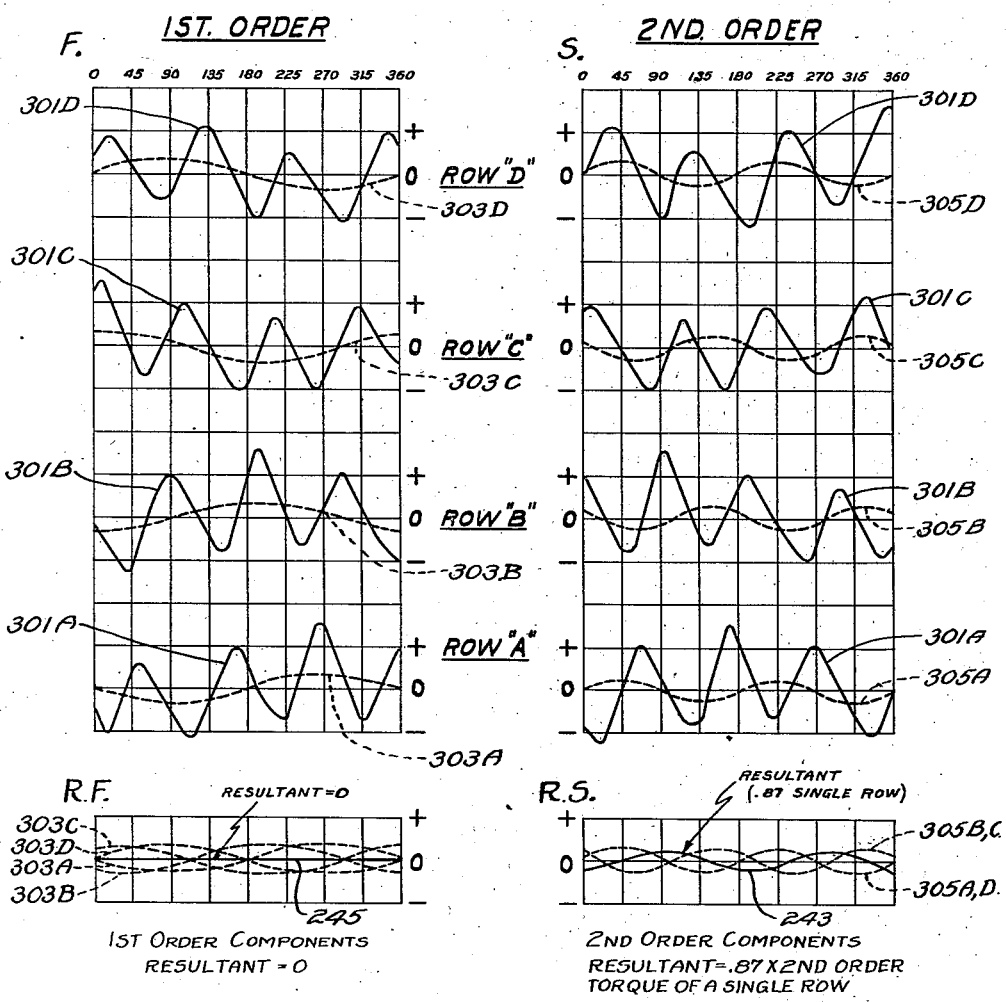
Fig. 10 is a graph showing at F the phase relationship among the first order harmonics of the torque forces in each of the cylinder rows of the engine of Figs. 1 and 2; at S the relationship among second order harmonics of each row; and at RF and RS the resultants of the first and second order harmonics for the engine as a whole.

According to this invention, engine master rods, crankshaft, and counterbalances rotating at twice crankshaft speed are provided in a combination and arrangement which will almost completely balance or cancel out all the shaking and torsional forces of any material size resulting from the dissymmetry of the articulated connecting rod systems of a four row radial engine having master and link rods, without objectionably increasing the total engine weight.

Referring to the drawing, Fig. 1, the crankcase 34 has mounted thereon four circumferential rows A, B, C, D, of cylinders 215 arranged around the axis of the crankshaft 58 in seven longitudinal banks marked 1 to 7. The cylinders of each row are circumferentially offset by equal angles with respect to corresponding cylinders of adjacent rows so that each bank extends spirally with respect to the crankshaft axis, in a right-hand helix. The front cylinder of one bank is offset by the same angle with respect to the rear cylinder of an adjacent bank. Thus the projections of the cylinder axes on a plane normal to the crankshaft axis (Fig. 2) are equally spaced around the crankshaft. Because there are twenty-eight cylinders in all, the angle between any two adjacent cylinder axes is $12\cdot6/7°$.

Crankshaft 58 is approximately flat as shown in Fig. 3. Adjacent throws AB, BC, CD are disposed on opposite sides of the crankshaft so that crankpins 172, 174, 176, 178 alternate in position, up and down, and are displaced by 180° plus the angle of the cylinder spacing. As shown in Fig. 4 (in which the plane of the front throw D is represented by dotted lines in the other three throws), front intermediate throw C is displaced counterclockwise from front throw D by an angle of 180° plus $12\cdot6/7°$ or a total of $192\cdot6/7°$. Similarly, the rear intermediate throw B is displaced counterclockwise from row C by $192\cdot6/7°$ and the rear throw A is displaced counterclockwise from throw B by $192\cdot6/7°$. Crankshaft 58 is balanced with a pair of counterweights 198, 200 (Figs. 3 and 5), which may be subdivided if desired to provide four counterweights 198, 199, 200, 201 (Figs. 6 and 7).

This combination of cylinder arrangement and crankthrow arrangement causes two pistons in any one bank to be simultaneously on top dead center while the other two pistons of the same bank are simultaneously on bottom dead center. For instance, when the crankshaft is in a position in which the piston of row D bank 1 is on top dead center, then the pistons of cylinders C1 and A1 will be on bottom dead center and the piston of cylinder B1 will be on top dead center.

Each crankpin is connected to the pistons in the corresponding cylinder row by an articulated connecting rod assembly comprising a master rod having a big end journalled on the crankpin and link rods pivoted to the big end of the master rod. Such master and link rod systems constitute the best commercially practical method at present known for connecting the pistons of a radial engine to a crankshaft. As they are well-known per se, the link rods have been omitted from Fig. 1 to simplify the drawing. As shown schematically in this figure, and by the letter "M" in Fig. 2, master rod 207 of D row is connected to the piston in cylinder D1, master rod 209 of C row is connected to the piston in cylinder C3, master rod 211 of row B is connected to the piston of cylinder B3, and master rod 213 of row A is connected to the piston in cylinder A1. With such an arrangement the front and rear master rods are connected to pistons in the front and rear cylinders in the same bank, separated by three cylinder spaces, while the two intermediate master rods are connected to pistons in adjacent cylinders of a bank which is displaced by approximately 90 degrees from the bank containing the front and rear master rods.

While the articulated connecting rod system is most practical for radial engines, it has the disadvantage that the geometry of the linkage used causes dissimlar piston movements among the pistons of a cylinder row. These different piston movements give rise to unequal and unbalanced inertia forces and gas forces, exerted by the pistons and connecting rod assembly of a cylinder row on the crankshaft to which the connecting rod assembly is connected.

Two of these forces result from the fact that the articulated connecting rod system causes variations in the turning effort or torque applied to the crankshaft. If the torque exerted on the crankshaft by the articulated connecting rod assembly of any one cylinder row is plotted against crankshaft position, during two crankshaft revolutions, the resulting curve has a series of peaks, which are alternately positive and negative with respect to the average or mean torque line indicated in Figs. 9 and 10 as the zero line, as shown by the curve 301 in Fig. 9. These peaks vary in magnitude and the torque curve is non-uniform because of the dissimilar piston movements caused by the geometry of the articulated connecting rod system. This curve (which may be determined experimentally or may be calculated) is periodic, being repeated in each cycle of engine operation, or for each two successive crankshaft revolutions in which all the cylinders of any one row are fired, as shown in Fig. 2. Hence it may be resolved into a number of sine waves, or harmonics, which when added together produce a resultant that has exactly the same frequency and amplitude as the original curve. Two of these harmonics which have frequencies respectively equal to and twice the crankshaft R. P. M., are shown at 303 and 305 in Fig. 9. These two first and second order torsional forces have frequencies and magnitudes that render them particularly detrimental in engines of the type described.

Figure 9:
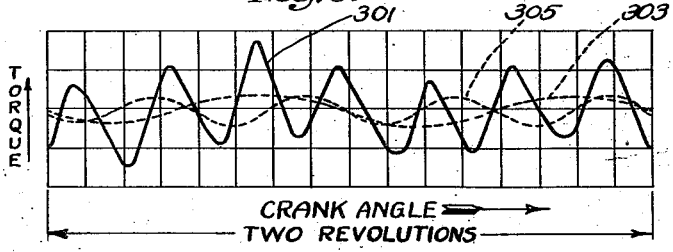
Fig. 9 is a torque curve showing variations in the turning force applied to the crankpin of any one of the cylinder rows during two crankshaft revolutions of the engine of Figs. 1 and 2, and including in dotted lines certain harmonics of said torque curve.

As the variation of the torque curve from one having uniform peaks is caused by the geometry of the articulated connecting rod system, the force represented by curve 301 in Fig. 9 will be repeated in each of the cylinder rows A, B, C, D of Figs. 1 and 2. The phase relationship of these curves, and of their first and second order harmonics, is determined by the relative position of the master rods and crankpins, and is shown in Fig. 10 for the combination and arrangement of Figs. 1 to 7.

Fig. 10 shows under the graph headed "1st order" the phase relationships between the first order torsional forces or harmonics of the rows D, C, B, and A, represented respectively by the curves 303D, 303C, 303B, and 303A. These curves are combined in the lower left-hand graph to produce the resultant curve 245, which represents the resultant first order torsional force for the engine as a whole. It will be seen that the phase relationships of these various first order torsional forces are such as to produce a resultant torsional first order force which is equal to zero. Thus for the engine as a whole, the first order torsionals are completely eliminated.

Referring to Fig. 11, the first order torsional forces produced by the master rod and crankthrow combination of Figs. 1 to 7 are shown in a phase diagram for the respective rows D, C, B and A at 225, 227, 229, 231. It should be noted that this diagram does not show vectors in the sense of forces having directions, but merely shows the phase relationship between the respective first order torsional forces produced in each row. For instance, there will be a torsional force represented at 225 produced in row D which is of the first order, or which rotates at crankshaft speed. If this force at a particular instant is represented at 225 then the corresponding first order torsional forces of rows C, B, and A will have phases relative to the force 225 as represented at 227, 229, and 231. Because for each torque there is an equal and opposite torque, the resultant is zero.

The second order torsional force in each row, represented at 305 in Fig. 9, has a frequency and magnitude that is less likely to cause vibrational engine troubles than the second order shaking forces and the first order torsional forces. In addition, the resultant second order torsional force for the engine as a whole is even less than the second order torsional force produced in a single row, with the master rod, crankthrow, and cylinder combination and arrangement illustrated in Figs. 1 to 7. With this combination of parts the second order torsional forces of the rows D, C, B and A will be in the phase relationship at any instant as shown at 305D, 305C, 305B, and 305A in Fig. 10. The resultant second order torsional force is shown at 243 in the graph at the lower right of Fig. 10. This resultant is only .87 times as great as the second order torque produced in any one cylinder row.

Referring to the diagram of Fig. 12, the phase of the second order torsional forces is represented for both D row and A row by the line 237, while the phase of the corresponding forces for both the B and C cylinder rows is represented by the line 235. The resultant second order torsional force for the engine as a whole is represented by the line 239, and is of such small magnitude that it may be neglected in practice.

Another force produced by each articulated rod system is the second order shaking or whirling force, an unbalanced force found to be particularly troublesome in engines of the type described. This force rotates at twice crankshaft speed and is exerted in a direction transverse to the crankshaft axis. The vector representing this force in any one cylinder row rotates about the crankshaft axis at twice crankshaft speed and has a definite angular position at any instant determined by the relative position of the master rod cylinder and of the crankpin for that row. When the master rod piston is on top dead center, or when the master rod is up and the axis of the master rod is in alignment with the axis of the cylinder and lies within the plane of the crankshaft throw, then this second order shaking vector also lies within the plane of the crankshaft throw and the force represented by this vector is exerted downwardly on the crankshaft by the piston and connecting rod assembly. In other words, when the crankshaft throw is up on top dead center for the master rod cylinder, the second order shaking vector is coaxial with the cylinder axis and points away from the piston. As the vector rotates at twice crankshaft speed, it will again be coaxial with the axis of the master rod cylinder and will again point downwardly away from the piston when the crankpin is in a position placing the piston to which the master rod is attached on bottom dead center.

A second order shaking force as described above is produced by each row of pistons and its associated articulated connecting rod assembly, hence there will be such an unbalanced force existing during engine operation in each of the cylinder rows A, B, C, and D of the four row engine illustrated in the drawing.

With the combination and arrangement of crankthrows shown in Figs. 1 to 7, and for the crankshaft position shown in Figs. 1 and 2, the second order shaking vector of row D will be in the position shown at 217 in Fig. 8. Knowing the location of the vector when the master rod piston is at either top dead center or bottom dead center, then it can also be located for any other crankshaft position; and this has been done in Fig. 8 for the crankshaft position shown in Figs. 1 and 2, the vector position relative to the crankshaft axis being represented by the line 217. For this same crankshaft position the second order shaking forces of rows C, B and A will be disposed respectively as shown by the vectors 219, 221, and 223 in Fig. 8, when the master rods and crankthrows are relatively positioned as shown in Figs. 1 to 7.

The force resultant of all the four shaking forces exerted by the pistons and connecting rod assemblies of rows A, B, C, and D on the crankshaft 58 is shown at 241 in Fig. 8, and is 2.42 times the magnitude of the shaking force in one row. A resultant couple will also be produced because the vectors 217, 219, 221, 223 do not lie in a single plane and are spaced along the crankshaft, at the position of each cylinder row. This couple lies in a plane including the crankshaft axis and the line 243 in Fig. 8.

The resultant shaking forces are balanced, according to this invention, by the second order counterbalances 341, 347 shown in Figs. 13 and 14. The centers of mass of these balances (Fig. 14) are located approximately on a plane including the resultant shaking vector 241 and the crankshaft axis, and are disposed on opposite sides of this plane.

Balances 341, 347 are rotated at twice crankshaft speed on bearings 343, splined to the crankshaft at 345, by the spring drive gears 321, the pinions 323, 325 and the gears 329 on the counterbalances. Pinions 323, 325 are rotatably mounted on shafts 327 which are supported by walls 35, 39 of the crankcase 34.

With this arrangement, counterbalances 341, 347 will rotate in the direction of crankshaft rotation but at twice crankshaft speed, and the centers of mass of the balances are so located relative to the position of the vector 241 and the couple indicated at 243 (Fig. 14) so that such rotation produces forces exactly opposing the force 141 and the couple 243, thus eliminating the effect of this force and this couple upon the engine.

Reference is made to the Hobbs-Willgoos application Serial No. 552,372, filed concurrently herewith for details of the engine schematically shown in the drawings of this application.

Reference is made to our applications Serial No. 552,369 and Serial No. 552,370, filed concurrently herewith, which claim subject matter disclosed and not claimed in this application.

The word "longitudinal" is used in a broad sense in this application to include cylinder banks extending generally lengthwise.

It is to be understood that the invention is not limited to the specific embodiment herein illustrated and described. For instance, it may be used in engines having five or nine longitudinal banks, or more than four circumferential rows, or in other ways without departure from its spirit as defined by the following claims.

We claim:

1. In a radial engine having four circumferential rows of cylinders, an articulated connecting rod system including a master rod and link rod assembly for each of said cylinder rows, said master rods being disposed in selected cylinders so related angularly relative to each other that the first order torsional force produced during engine operation by each one of said rod assemblies is equal and opposite in phase with respect to the first order torsional force produced by a single other one of said rod assemblies.

2. The combination of claim 1, including a pair of counterbalances mounted on said crankshaft and driven at twice crankshaft speed in the direction of crankshaft rotation, said counterbalances being so located angularly as to produce a resultant force which equals and opposes at all times during engine operation the resultant second order shaking force produced by all of said rod assemblies.

3. In a four row radial engine, a four throw crankshaft and an articulated connecting rod system including a master rod and link rod assembly connecting the pistons of each row to the corresponding crankthrow, said master rods being so angularly disposed and said crankthrows being so angularly disposed that the top dead center positions of the master rod pistons occur respectively at approximately ninety degree intervals of crankshaft rotation.

4. In a radial aircraft engine having four circumferential cylinder rows and having seven cylinders in each row, said rows being angularly offset by equal angular increments with respect to each other to form spiral cylinder banks of four cylinders each, a crankshaft having four crankpins, one for each cylinder row, with adjacent crankpins being angularly separated by one hundred and eighty degrees plus the angle of offset of corresponding cylinders in adjacent cylinder rows, an articulated connecting rod assembly including a master rod for connecting each crankpin to the cylinders of the corresponding cylinder row, the front and rear row master rods being located in the end cylinders of the same cylinder bank and the master rods for the intermediate cylinder rows being positioned in cylinders of a bank spaced by approximately one hundred and three degrees from the bank containing said front and rear master rods.

5. In a radial engine having cylinders arranged in four circumferential rows and at least seven longitudinally extending circumferentially spaced banks, a crankshaft having a crankpin for each of said rows, a master rod and link rod assembly connecting the pistons of each of said rows with a corresponding crankpin, the two intermediate master rods being respectively connected to adjacent pistons in the intermediate cylinders of one of said cylinder banks, and the two end master rods being respectively connected to pistons in the end cylinders of a cylinder bank which is separated by two interbank spaces from said first named cylinder bank.

AUGUSTUS HASBROUCK.
ALEXANDER H. KING.
LEWIS MORGAN PORTER.
GEORGE L. WILLIAMS.

REFERENCES CITED

The following references are of record in the file of this patent:

UNITED STATES PATENTS

| Number | Name | Date |
|---|---|---|
| 2,182,988 | Iseler | Dec. 12, 1939 |
| 2,195,550 | Williams | Apr. 2, 1940 |

FOREIGN PATENTS

| Number | Country | Date |
|---|---|---|
| 50,255 | France | Jan. 29, 1940 |